US012392476B2

(12) United States Patent
Yang

(10) Patent No.: US 12,392,476 B2
(45) Date of Patent: Aug. 19, 2025

(54) LED LIGHT STRING MOUNTING STRUCTURE

(71) Applicant: Lusha Yang, Taizhou (CN)

(72) Inventor: Lusha Yang, Taizhou (CN)

( * ) Notice: Subject to any disclaimer, the term of this patent is extended or adjusted under 35 U.S.C. 154(b) by 0 days.

(21) Appl. No.: 18/615,931

(22) Filed: Mar. 25, 2024

(65) Prior Publication Data

US 2025/0243994 A1 Jul. 31, 2025

(30) Foreign Application Priority Data

Jan. 31, 2024 (CN) ......................... 202420235345.4

(51) Int. Cl.
*F21V 19/00* (2006.01)
*F21S 4/10* (2016.01)
*F21Y 115/10* (2016.01)

(52) U.S. Cl.
CPC ............ *F21V 19/0025* (2013.01); *F21S 4/10* (2016.01); *F21V 19/003* (2013.01); *F21Y 2115/10* (2016.08)

(58) Field of Classification Search
CPC ..... F21S 4/10; F21Y 2115/10; F21Y 2107/90; H01L 25/0753; H05B 45/00; H05K 2201/10106; F21V 21/0832; F21W 2121/00; F21W 2131/10
See application file for complete search history.

(56) References Cited

U.S. PATENT DOCUMENTS

2012/0081900 A1* 4/2012 Yu ............................. F21S 4/10
362/267
2019/0341718 A1* 11/2019 Yu ......................... F21V 21/096

FOREIGN PATENT DOCUMENTS

CN 212510638 U 2/2019
CN 208687430 U 4/2019
CN 213458912 U 6/2021

* cited by examiner

*Primary Examiner* — Elmito Breval

(57) ABSTRACT

The present disclosure discloses a light-emitting diode (LED) light string mounting structure, and aims to provide an LED light string that is convenient for organizing conductive wires, has a good heat dissipation effect during working of LED lamps, and has good waterproof property. Key points of the technical solution of the LED light string mounting structure are that LED light-emitting modules are sleeved with a light-transmittance member and a lampshade, achieving a good protection effect on the LED light-emitting modules, and the conductive wires between adjacent LED lamps are combined into one group of wiring harness. Combining the several conductive wires between the adjacent LED lamps into one wiring harness prevents entangling of the conductive wires after long-time use of the light string and facilitates arrangement and storage of the light string; meanwhile, the light-transmittance member is arranged in the LED lamps.

5 Claims, 3 Drawing Sheets

LED LIGHT STRING MOUNTING STRUCTURE

TECHNICAL FIELD

The present disclosure relates to a light-emitting diode (LED) light string mounting structure, and more specifically, to an LED light string mounting structure.

BACKGROUND

An LED lamp, also referred to as a light-emitting diode, can convert electrical energy into light energy to meet the demand for illumination, thereby achieving a lighting function. The LED lamp has low energy consumption and a bright color, and can achieve various changes in color. At present, the LED lamps are frequently used as lighting and decoration props in people's life. Meanwhile, in order to improve the ornamental value and practical value of the LED lamps, the LED lamps are usually connected together through conductive wires to form an LED light string that is of a chain structure.

According to the LED light string used currently, a plurality of conductive wires are required to connect chips, so that there are many conductive wires between adjacent LED lamps. After long-term use, the conductive wires are easily entangled and difficultly organized, and the storage effect is poor. Moreover, when the LED lamps emit light, a large amount of heat may be generated, which can accelerate the aging of LED chips and affect the service life of the lamps. Furthermore, most of the LED lamps have poor waterproof effect, so that water vapor can easily enter their housing, causing a short circuit in the circuit and posing a danger.

SUMMARY

For the shortcomings in the prior art, the present disclosure aims to provide an LED light string that is convenient for organizing conductive wires, has a good heat dissipation effect during working of LED lamps, and has good waterproof property.

In order to achieve the above objectives, the present disclosure provides the following technical solutions: An LED light string mounting structure includes a lamp holder, a lampshade, a light-transmittance member arranged in the lampshade, and LED light-emitting modules; a threaded groove is arranged at a bottom of the lampshade; the light-transmittance member is in threaded connection with the lampshade through the threaded groove; a wiring groove is arranged at a bottom of the lamp holder; a wiring harness is electrically connected to the LED light-emitting modules through the wiring groove; and the light-transmittance member sleeves the LED light-emitting modules to protect the LED light-emitting modules.

Preferably, a placement platform configured to mount the LED light-emitting modules is arranged in the lamp holder; the wiring harness abuts against an edge of the placement platform; the LED light-emitting modules are connected to the placement platform through resin; and a height of the placement platform is greater than a distance from the bottom of the lamp holder to a top end of a lamp.

In a further setting of the present disclosure, the light-transmittance member includes a connecting portion and a light-transmittance portion; the connecting portion includes supporting members arranged on two sides of a bottom of the light-transmittance member; the supporting members are arc-shaped, and a distance between the supporting members can be adjusted according to a width of the placement platform; the light-transmittance portion is arranged at an upper end of the light-transmittance member; and a refraction region is arranged at a bottom of the light-transmittance portion.

Preferably, partition plates are further arranged on two sides of the placement platform; the partition plates are configured to isolate the light-transmittance member from the placement platform; and a distance between the partition plates is adjustable.

Preferably, limiting members are further arranged at bottoms of the supporting members of the light-transmittance member, and the limiting members are matched with the bottom of the lampshade in size to prevent looseness of the light-transmittance member after the lampshade is connected to a base.

In a further setting of the present disclosure, several conductive wire groups are arranged inside the wiring harness, and adjacent LED light-emitting modules are electrically connected through the wiring harness.

In a further setting of the present disclosure, a hook is arranged at the bottom of the lamp holder, and a hooking member is further arranged on one side of the lamp holder.

By the adoption of the above technical solutions, the LED light-emitting modules are sleeved with the light-transmittance member and the lampshade, achieving a good protection effect on the LED light-emitting modules, and the conductive wires between adjacent LED lamps are combined into one group of wiring harness. Combining the several conductive wires between the adjacent LED lamps into one wiring harness prevents entangling of the conductive wires after long-time use of the light string and facilitates arrangement and storage of the light string; and meanwhile, the light string can be arranged at a high place through the hook and the hooking member as required.

Further, in order to improve the waterproof property of the light string, the LED light-emitting modules are sleeved with the light-transmittance member and the lampshade, and the bottom of the light-transmittance member is matched with an opening in the bottom of the lampshade in size. After the lampshade is connected to the lamp holder, the opening in the bottom of the lampshade is sealed with the bottom of the light-transmittance member, which effectively prevents moisture inside the light-transmittance member. The light-transmittance member is fixed through the lampshade, which prevents the shaking of the light-transmittance member inside the lampshade and improves the stability of the light-transmittance member.

Meanwhile, the placement platform configured to mount the LED light-emitting modules are also arranged inside the lamp holder; the wiring harness abuts against the edge of the placement platform; the LED light-emitting modules are connected to the placement platform through the resin; the LED light-emitting modules are arranged on the placement platform, which makes wiring connection convenient. The LED light-emitting modules are connected to the placement platform through the resin, so that it ensures the waterproof property. The transparent resin can prevent a decrease in the lighting effect. Meanwhile, since the height of the placement platform is greater than the distance from the bottom of the lamp holder to the top end of the lamp, the light of the LED light-emitting modules will not be obstructed by an edge of the lamp holder, which further enhances the luminous effect.

In order to improve the stability of the light-transmittance member after mounting, the supporting members are arranged at the bottom of the light-transmittance member, and the distance between the supporting members can be adjusted according to the width of the placement platform. Meanwhile, the width of the placement platform can be adjusted according to the width of the wiring harness. In summary, the distance between the supporting members can always be matched with the width of the placement platform. Further, due to the trend of inward deformation of the supporting members after the supporting members are connected to the placement platform, a pressure will be applied to the two sides of the placement platform. This can further improve the stability of the connection and prevent the light-transmittance member from falling off from the placement platform.

Secondly, in order to avoid a high temperature and poor heat dissipation effect of LED lamps after long-term use, which can shorten the service lives of the lamps, the light-transmittance portion is arranged on the light-transmittance member, and a cavity is formed between the light-transmittance member and the LED light-emitting modules after the light-transmittance member is mounted on the lamp holder, which effectively prevents heat accumulation during the operation of the LED light-emitting modules and enhances the heat dissipation effect. In addition, the refraction region is arranged at the bottom of the light-transmittance portion. The refraction region can concentrate the light emitted by the LED light-emitting modules, which enhances the lighting effect. The light-transmittance portion is long, which can effectively dissipate heat of the LED light-emitting modules and has a good heat dissipation effect.

Figure 1:
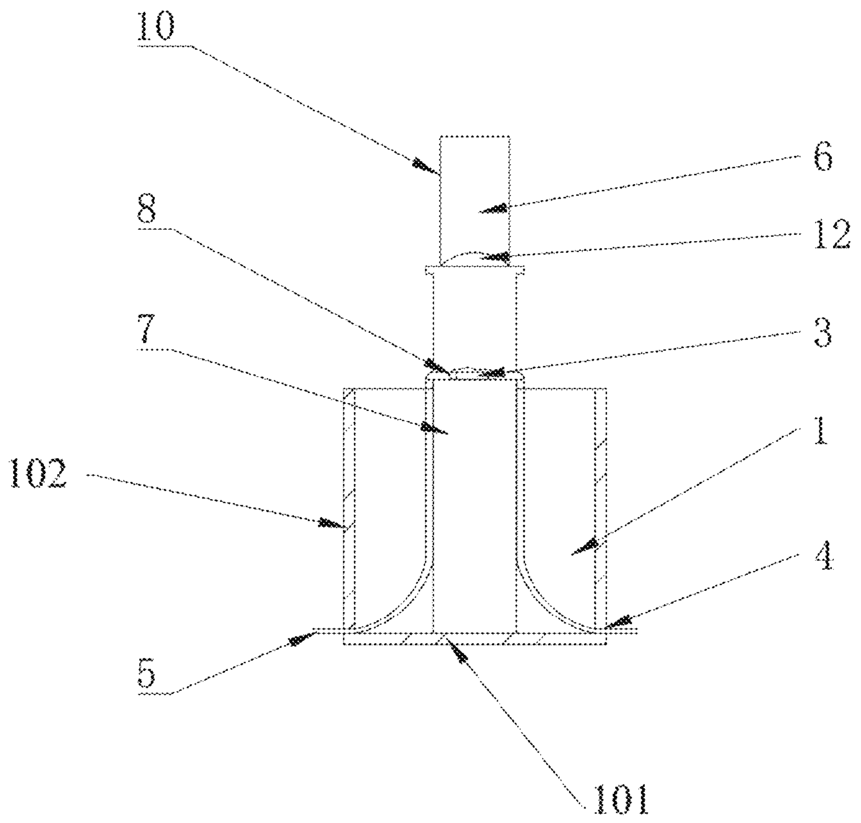
FIG. 1 is a sectional view of a light-transmittance member and a lamp holder according to an embodiment of an LED light string mounting structure of the present disclosure.

Reference numerals in the drawings: 1: lamp holder; 101: cover body; 102: cap body; 2: lampshade; 3: LED light-emitting module; 4: wiring groove; 5: wiring harness; 6: light-transmittance member; 7: placement platform; 8: resin; 9: connecting portion; 10: light-transmittance portion; 11: supporting member; 12: refraction region; 13: partition plate; 14: limiting member; 15: hook; and 16: hooking member; 17: wiring structure; 171: wiring hole.

DETAILED DESCRIPTION OF THE EMBODIMENTS

Figure 2:
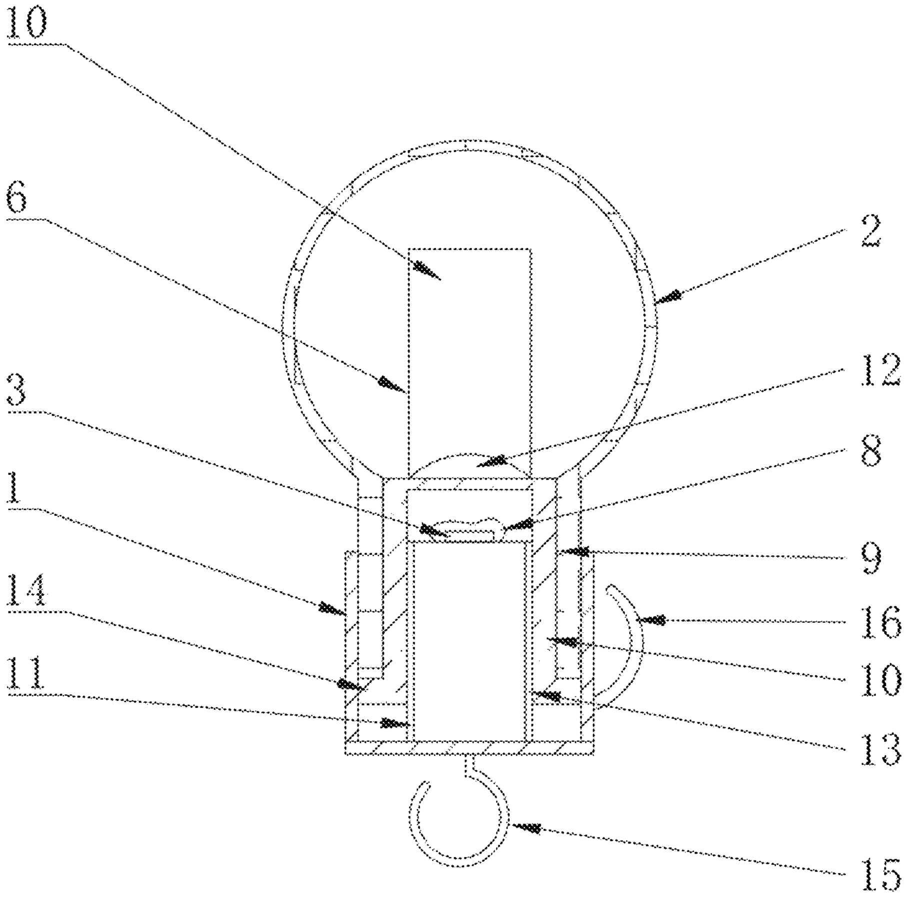
FIG. 2 is a sectional view of a light-transmittance member, a lampshade and a lamp holder according to an embodiment of an LED light string mounting structure of the present disclosure in another direction.
Figure 3:
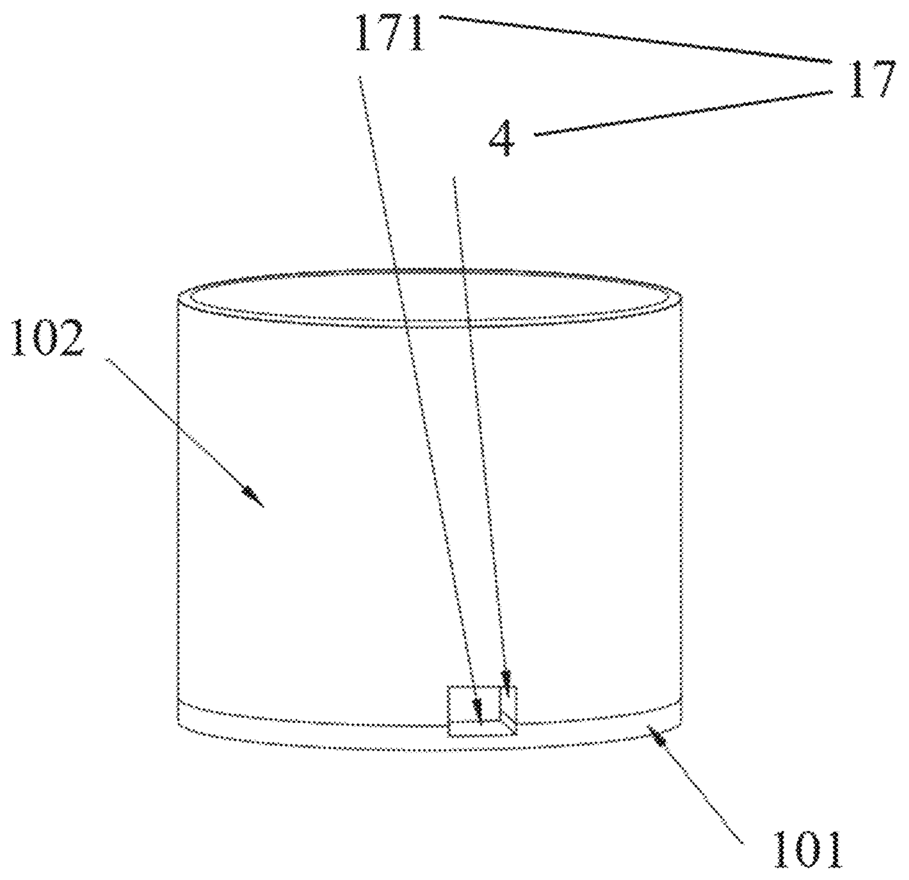
FIG. 3 is a perspective view of the lamp holder according to the embodiment of the LED light string mounting structure of the present disclosure.

Referring to FIG. 1 to FIG. 2, a further explanation is made to the embodiment of an LED light string mounting structure according to the present disclosure.

For ease of explanation, spatial relative terms such as “up”, “down”, “left”, and “right” are used in the embodiments to illustrate a relationship between one element or feature shown in the figures and another element or feature. It should be understood that in addition to the orientations shown in the figures, the spatial terms are intended to include different orientations of a device during use or operation. For example, if the device in the figures is placed upside down, an element described as being located “below” another element or feature will be positioned as being “above” the another element or feature. Therefore, the exemplary term “down” can include both up and down orientations. The device can be positioned in other ways (rotated 90 degrees or in other orientations), and the spatial relative explanations used here can be explained correspondingly.

Moreover, relational terms such as “first” and “second” are only used to distinguish one component from another with the same name, without necessarily requiring or implying any actual relationship or order between these components.

An LED light string mounting structure includes a lamp holder 1, a lampshade 2, a light-transmittance member 6 arranged in the lampshade 2, and LED light-emitting modules 3; a threaded groove is arranged at a bottom of the lampshade 2; the light-transmittance member 6 is in threaded connection with the lampshade 2 through the threaded groove; a wiring groove 4 is arranged at a bottom of the lamp holder 1; a wiring harness 5 is electrically connected to the LED light-emitting modules 3 through the wiring groove 4; several conductive wire groups are arranged in the wiring harness 5, and adjacent LED light-emitting modules 3 are electrically connected through the wiring harness 5;

the light-transmittance member 6 sleeves the LED light-emitting modules 3 to protect the LED light-emitting modules 3; meanwhile, a placement platform 7 configured to mount the LED light-emitting modules 3 is arranged in the lamp holder 1; the wiring harness 5 abuts against an edge of the placement platform 7; the LED light-emitting modules 3 are connected to the placement platform 7 through resin 8; a height of the placement platform 7 is greater than a distance from the bottom of the lamp holder 1 to a top end of a lamp; a hook 15 is arranged at a bottom of the lamp holder 1, and a hooking member 16 is further arranged on one side of the lamp holder 1.

The LED light-emitting modules 3 are sleeved with the light-transmittance member 6 and the lampshade 2, achieving a good protection effect on the LED light-emitting modules 3, and the conductive wires between adjacent LED lamps are combined into one group of wiring harness 5. Combining the several conductive wires between the adjacent LED lamps into one wiring harness 5 prevents entangling of the conductive wires after long-time use of the light string and facilitates arrangement and storage of the light string; and meanwhile, the light string can be arranged at a high place through the hook 15 and the hooking member 16 as required.

Preferably, in order to improve the waterproof property of the light string, the LED light-emitting modules 3 are sleeved with the light-transmittance member 6 and the lampshade 2, and a bottom of the light-transmittance member 6 is matched with an opening in the bottom of the lampshade 2 in size. After the lampshade 2 is connected to the lamp holder 1, the opening in the bottom of the lampshade 2 is sealed with the bottom of the light-transmittance member 6, which effectively prevents moisture inside the light-transmittance member 6. The light-transmittance member 6 is fixed through the lampshade 2, which prevents the shaking of the light-transmittance member 6 inside the lampshade 2 and improves the stability of the light-transmittance member 6.

Meanwhile, the placement platform 7 configured to mount the LED light-emitting modules 3 are also arranged inside the lamp holder 1; the wiring harness 5 abuts against the edge of the placement platform 7; the LED light-emitting modules 3 are connected to the placement platform 7 through the resin 8; the LED light-emitting modules 3 are arranged on the placement platform 7, which makes wiring connection convenient. The LED light-emitting modules 3 are connected to the placement platform 7 through the resin 8, so that it ensures the waterproof property. The transparent resin 8 can prevent a decrease in the lighting effect. Meanwhile, since the height of the placement platform 7 is greater than the distance from the bottom of the lamp holder 1 to the top end of the lamp, the light of the LED light-emitting modules 3 will not be obstructed by an edge of the lamp holder 1, which further enhances the luminous effect.

In order to improve the stability of the light-transmittance member 6 after mounting, the light-transmittance member 6 is divided into a connecting portion 9 and a light-transmittance portion 10. The connecting portion 9 includes supporting members 11 arranged on two sides of the bottom of the light-transmittance member 6; the supporting members the supporting members 11 are arc-shaped, and a distance between the supporting members 11 can be adjusted according to a width of the placement platform 7; the light-transmittance portion 10 is arranged at an upper end of the light-transmittance member 6; a groove is arranged at a top end of the light-transmittance portion 10; a refraction region 12 is arranged at a bottom of the light-transmittance portion 10; partition plates 13 are also arranged on two sides of the placement platform 7; the partition plates 13 are configured to isolate the light-transmittance member 6 from the placement platform 7, and a distance between the partition plates 13 is adjustable; and the width of the placement platform 7 can be adjusted according to a width of the wiring harness 5. In summary, the distance between the supporting members 11 can always be matched with the width of the placement platform 7. Further, due to the trend of inward deformation of the supporting members after the supporting members 11 are connected to the placement platform 7, a pressure will be applied to the two sides of the placement platform 7. This can further improve the stability of the connection and prevent the light-transmittance member 6 from falling off from the placement platform 7.

Secondly, in order to avoid a high temperature and poor heat dissipation effect of LED lamps after long-term use, which can shorten the service lives of the lamps, the light-transmittance portion 10 is arranged on the light-transmittance member 6, and a cavity is formed between the light-transmittance member 6 and the LED light-emitting modules 3 after the light-transmittance member is mounted on the lamp holder 1, which effectively prevents heat accumulation during the operation of the LED light-emitting modules 3 and enhances the heat dissipation effect. In addition, the refraction region 12 is arranged at the bottom of the light-transmittance portion 10. The refraction region 12 can concentrate the light emitted by the LED light-emitting modules 3, which enhances the lighting effect. The light-transmittance portion 10 is long, which can effectively dissipate heat of the LED light-emitting modules 3 and has a good heat dissipation effect.

The above-mentioned embodiments are only preferred embodiments of the present disclosure and are not intended to limit the present disclosure, and the usual changes and substitutions made by those skilled in the art within the scopes of the technical solutions of the present disclosure shall fall within the protection scope of the present disclosure.

What is claimed is:

1. A light-emitting diode (LED) light string mounting structure, comprising a lamp holder (1), a lampshade (2), a light-transmittance member (6) arranged on the lamp holder (1), several LED light-emitting modules (3), and a wiring harness (5), wherein the lamp holder (1) comprises a cover body (101) and a cap body (102) that is detachably connected to the cover body (101); an inner wall of the cap body (102) is provided with a threaded groove; the lamp holder (1) is in threaded connection to the lampshade (2) through the threaded groove arranged on the inner wall of the cap body (102); a wiring structure 17 is arranged between the cover body (101) and the cap body (102); the wiring structure 17 comprises wiring holes (171) symmetrically arranged between the cover body (101) and the cap body (102), and a wiring groove (4) arranged on the cover body (101); a wiring path of the wiring harness (5) exits from the wiring hole (171) on one side through the wiring groove (4) and then through the wiring hole (171) on the other side; the wiring harness (5) is electrically connected to the LED light-emitting modules (3); the LED light-emitting modules (3) are arranged in the wiring groove (4); and the light-transmittance member (6) sleeves the LED light-emitting modules (3) and are arranged in the lampshade (2);

the cover body (101) is provided with a placement platform (7); the wiring groove (4) is arranged on the placement platform (7); the wiring path of the wiring harness (5) abuts against an edge of the placement platform (7); the LED light-emitting modules (3) are connected to the wiring harness (5) through resin (8); and a height of the placement platform (7) is greater than a distance from a bottom of the lamp holder (1) to a top end of a lamp;

the light-transmittance member (6) comprises a connecting portion (9) and a light-transmittance portion (10); the connecting portion (9) comprises supporting members (11) arranged on two sides of a bottom of the light-transmittance member (6); the supporting members (11) are arc-shaped, and a distance between the supporting members (11) is adjusted according to a width of the placement platform (7); the light-transmittance portion (10) is arranged at an upper end of the light-transmittance member (6); and a refraction region (12) is arranged at a bottom of the light-transmittance portion (10).

2. The LED light string mounting structure according to claim 1, wherein partition plates (13) are further arranged on two sides of the placement platform (7); the partition plates (13) are configured to isolate the light-transmittance member (6) from the placement platform (7); and a distance between the partition plates (13) is adjustable.

3. The LED light string mounting structure according to claim 1, wherein limiting members (14) are further arranged at bottoms of the supporting members (11) of the light-transmittance member (6), and the limiting members (14) are matched with the bottom of the lampshade (2) in size to prevent looseness of the light-transmittance member (6) after the lampshade (2) is connected to a base.

4. The LED light string mounting structure according to claim 1, wherein the wiring harness (5) is internally provided with several conductive wire groups, and adjacent LED light-emitting modules (3) are electrically connected through the wiring harness (5).

5. The LED light string mounting structure according to claim 1, wherein a hook (15) is arranged at a bottom of the lamp holder (1), and a hooking member (16) is further arranged on one side of the lamp holder (1).

* * * * *